US011932451B2

United States Patent
Corbett et al.

(10) Patent No.: US 11,932,451 B2
(45) Date of Patent: Mar. 19, 2024

(54) SYSTEM AND METHOD FOR CONNECTING MULTI-PART CONTAINER WITH INTER-CONNECTING FEATURES

(71) Applicant: ECO.LOGIC BRANDS INC., Manteca, CA (US)

(72) Inventors: Julie Corbett, Oakland, CA (US); Gregory Rodrigues, San Francisco, CA (US); Romeo Graham, Ottawa (CA); Robert Watters, Ottawa (CA); Philip Streets, Ottawa (CA); Luc Boucher, Ottawa (CA)

(73) Assignee: ECO.LOGIC BRANDS INC., Manteca, CA (US)

( * ) Notice: Subject to any disclaimer, the term of this patent is extended or adjusted under 35 U.S.C. 154(b) by 0 days.

(21) Appl. No.: 17/861,892

(22) Filed: Jul. 11, 2022

(65) Prior Publication Data

US 2022/0340335 A1 Oct. 27, 2022

Related U.S. Application Data

(63) Continuation of application No. 16/561,312, filed on Sep. 5, 2019, now Pat. No. 11,383,887, which is a (Continued)

(51) Int. Cl.

*B65D 25/18* (2006.01)
*B31B 105/00* (2017.01)
(Continued)

(52) U.S. Cl.

CPC ............ *B65D 25/16* (2013.01); *B65D 25/18* (2013.01); *B31B 2105/00* (2017.08); (Continued)

(58) Field of Classification Search

CPC ......... B65D 25/16; B65D 25/18; B65D 11/08
See application file for complete search history.

(56) References Cited

U.S. PATENT DOCUMENTS 3,154,827 A 11/1964 Gentry
3,249,284 A 5/1966 Wood
(Continued)

FOREIGN PATENT DOCUMENTS

DE 202009016772 U1 4/2010
EP 0197683 A1 10/1986
(Continued)

OTHER PUBLICATIONS

EP Application 18764130.3; Extended European Search Report; dated Jan. 19, 2021, 7 pages.
(Continued)

*Primary Examiner* — Jason L Vaughan
*Assistant Examiner* — Amanda Kreiling
(74) *Attorney, Agent, or Firm* — CANTOR COLBURN LLP

(57) ABSTRACT

Methods and systems for integrating multiple portions of a container are provided. The method and system are specifically designed for integrating multiple shell portions with ear lobe-shaped tabs. The method comprises: providing a first set of retention structures to be associated with a plurality of inter-connecting features formed on an edge of a first shell part, wherein the first set of retention structures comprise at least a lead-in feature and a retention feature; providing a second set of retention structures to be associated with a plurality of inter-connecting features formed on an edge of a second shell part, wherein the second set of retention structures comprise at least a deflection feature and a retention feature; and engaging the two shell parts with aid of the retention structures.

17 Claims, 12 Drawing Sheets

Related U.S. Application Data continuation of application No. PCT/US2018/021314, filed on Mar. 7, 2018.

(60) Provisional application No. 62/468,255, filed on Mar. 7, 2017.

(51) Int. Cl.

| | |
|---|---|
| ***B65D 25/16*** | (2006.01) |
| *B65D 6/00* | (2006.01) |
| *B65D 8/02* | (2006.01) |
| *B65D 65/46* | (2006.01) |
| *B65D 77/06* | (2006.01) |

(52) U.S. Cl.

CPC .............. *B65D 11/08* (2013.01); *B65D 13/04* (2013.01); *B65D 65/466* (2013.01); *B65D 77/06* (2013.01)

(56) References Cited

U.S. PATENT DOCUMENTS

| | | | | |
|---|---|---|---|---|
| 3,306,520 A | | 2/1967 | Allard | |
| 3,341,908 A | | 9/1967 | Lock | |
| 3,446,417 A | | 5/1969 | Eisenberg | |
| 4,433,807 A | | 2/1984 | Ganz | |
| 4,846,394 A | | 7/1989 | Swanson | |
| 5,056,679 A | | 10/1991 | Lonczak | |
| 5,065,891 A | | 11/1991 | Casey | |
| 5,372,269 A | | 12/1994 | Sutton et al. | |
| 5,415,613 A | * | 5/1995 | McGrath | B65B 51/00 493/137 |
| 5,940,935 A | | 8/1999 | Julius | |
| 6,299,010 B1 | | 10/2001 | Hsu | |
| 6,315,123 B1 | | 11/2001 | Ikeda | |
| 8,887,941 B2 | | 11/2014 | Heintzman | |
| 2002/0084273 A1 | | 7/2002 | Ming | |
| 2007/0194020 A1 | | 8/2007 | Hotze | |
| 2007/0194022 A1 | | 8/2007 | Huggett | |
| 2008/0289232 A1 | | 11/2008 | Richards | |
| 2012/0145710 A1 | | 6/2012 | Corbett et al. | |
| 2013/0283739 A1 | | 10/2013 | Tasner et al. | |
| 2019/0135479 A1 | | 5/2019 | Corbett et al. | |
| 2020/0071025 A1 | | 3/2020 | Corbett et al. | |

FOREIGN PATENT DOCUMENTS

| | | | |
|---|---|---|---|
| JP | 2011234711 | A | 11/2011 |
| NL | 6508464 | A | 1/1966 |
| SE | 302740 | B | 7/1968 |
| WO | 02090209 | A1 | 11/2002 |
| WO | 2017181095 | A1 | 10/2017 |
| WO | 2018165276 | A1 | 9/2018 |

OTHER PUBLICATIONS

EP17783301.9 The Extended European Search Report dated Sep. 6, 2019.

PCT/US2017/027745 International Search Report and Written Opinion dated Jul. 10, 2017.

PCT/US2018/021314 International Search Report dated May 10, 2018.

U.S. Appl. No. 16/160,964 Office Action dated Jul. 9, 2020.

Australian Office Action for Australian Application No. 2018230357; Office Action dated Jan. 11, 2023 (pp. 1-4).

* cited by examiner

SYSTEM AND METHOD FOR CONNECTING MULTI-PART CONTAINER WITH INTER-CONNECTING FEATURES

CROSS-REFERENCE TO RELATED APPLICATIONS

This application is a Continuation of U.S. application Ser. No. 16/561,312, filed on Sep. 5, 2019, which is a Continuation application of International Patent Application No. PCT/US2018/021314, filed Mar. 7, 2018, which claims priority to U.S. Application No. 62/468,255, filed on Mar. 7, 2017, each of which is incorporated by reference herein in its entirety.

BACKGROUND OF THE INVENTION

Paper bottles such as molded fiber, fiber or pulp bottles are degradable and widely recyclable that benefit the environment. However, current paper bottles and containers are made of a plurality of parts that need to be joined together with glue and the manufacture of these bottles is complex and costly and involves significant use of adhesives (e.g., glue) and time. The use of adhesive during the assembly process poses a number of challenges. It can be slow, especially as the adhesive needs to be applied to a detailed path which is the case for a pulp bottle, resulting low manufacturing output and high cost. Additionally, adhesives properties are easily affected by factors that can be difficult to control including: humidity, temperature, compression, and settling time.

It is known that cardboard has techniques using slots and tabs for closure or connection. However, in most cases, these assembly features are disposed to an outer portion of a container that affects the smoothness of the surface. Also, these assembly features are typically used for connecting structures on a corner or a substantially planar surface (e.g. paperboard panels) that do not contain complex three dimensional shapes. Furthermore, when the tab is inserted into an opening during engagement, it is difficult to operate without folding or creasing the tab which may lead to a source of weakness when loading force is applied.

Accordingly, there is a need for improved method for connecting container parts with mechanical structures without introducing additional connecting components.

SUMMARY OF THE INVENTION

The embodiments described herein can address the above need by providing methods and apparatuses that can mechanically connect one or more parts of a container together via mechanical connection features. Mechanical connection features such as tabs and slots are used for assembling containers. The engaged connection features may be disposed internal to the assembled containers. This results in the exterior of the container having a relatively smooth container exterior. However, when the tab is inserted into an opening during engagement, it is difficult to operate without folding or creasing the tab which may lead to a source of weakness when loading force is applied. Thus the method and apparatuses may be provided to improve the integration of containers through inter-connecting features. The container may be formed by multiple parts. The container may be formed by a single piece shell with two or more sides to be joined together. The interlocking method can be used for containers made of different recyclable and compostable materials.

In one aspect, the present invention provides methods and apparatuses for connecting molded pulp, fiber or paper parts together. This can be single shells being joined together, or hinged shells that are connected along a hinge. Alternatively, this can be multiple shell parts being joined together. When the single shells or multiple shell parts are in an assembled configuration, the locking features are disposed in an enclosure of the container and form a smooth seam on the outer surface of the container. In some embodiments, the connecting method may not require glue or other adhesives. The method or apparatus is configured to be adapted for various materials, inter-connecting features, sizes and shapes of shell parts and the like. The method or apparatus may assist the integration process by reducing the friction and/or avoiding permanent deformation of the inter-connection features thereby improving the strength and performance of the container and efficiency of the assembly.

In one aspect, a method for forming or assembling a container is provided. In practice, the method comprises: providing a first set of retention structures to hold in place and be associated with a first set of inter-connecting features formed on a first edge of the container; providing a second set of retention structures to hold in place and be associated with a second set of inter-connecting features formed on a second edge of the container; and engaging the first set of inter-connecting features and the second set of inter-connecting features with aid of the first set of retention structures and the second set of retention structures.

In some embodiments, each of the retention structures comprises a lead-in feature and a retention feature which are configured to guide each of the inter-connecting features into a pre-defined slope during the engagement of the two edges. In some cases, the retention feature is made of a flexible material. In some cases, the retention feature comprises using vacuum to retain the inter-connecting features.

In some embodiments, each of the second set of retention structures comprises a deflection feature which is configured to deflect the first set of inter-connecting features to a pre-determined deflection level so as to reduce friction or collision during the engagement of the two edges.

In some embodiments, the first set of retentions structures or the second set of retention structures is rotatable. In some cases, a rotational movement of the first set of retention structures or the second set of retention structures is driven by one or more actuation units.

In some embodiments, the first set of retention structures or the second set of retention structures are switchable between a first configuration for loading a shell part and a second configuration for guiding an insertion movement of the first set of inter-connecting features or the second set of inter-connecting features.

In some embodiments, the first edge or the second edge comprises a curved segment. In some embodiments, the engaged inter-connecting features are aligned to an inner surface of the container. In some cases, the inner surface is a curved surface. In some embodiments the interconnecting features were formed through molding. In other embodiments the features we formed by die-cutting, laser cutting, punching cutting, steel rule and die, or other process or combination thereof.

In some embodiments, the first edge and the second edge are two edges of a single shell part. Alternatively, the first edge and the second edge are two edges of separate shell parts. In some embodiments, the first set of retention structures and the second set of retention structures are in an interleaved configuration after the engagement of the inter-connecting features.

In a separate yet related aspect, an apparatus for forming or assembling a container is provided. In practice, the apparatus comprises: a first set of retention structures to be associated with a first set of inter-connecting features formed on a first edge of the container; a second set of retention structures to be associated with a second set of inter-connecting features formed on a second edge of the container; and an actuation unit or mechanism configured to drive a relative movement between the first set of retention structures and the second set of retention structures for engaging the first edge with the second edge.

In some embodiments, the relative movement comprises the first set of retention structures bypassing the second set of retention structures. In some embodiments, at least a subset of the first set of retention structures or the second set of retention structures is removable. In some embodiments, the apparatus is configured to accommodate another container of a different length by removing a subset of the first set of retention structures or the second set of retention structures. In some embodiments, each of the retention structures comprises a retention feature and a lead-in feature configured to guide a tab feature of the first set of inter-connecting features insert through a slot feature of the second set of inter-connecting features.

In another aspect of the invention, a method for integrating a container is provided. The method comprises: providing a first set of retention structures to be associated with a plurality of inter-connecting features formed on a first edge of the container, wherein at least one of the first set of retention structures comprises a lead-in feature and a retention feature; providing a second set of retention structures to be associated with a plurality of inter-connecting features formed on a second edge of the container, wherein at least one of the second set of retention structures comprises a deflection feature and the retention feature; and engaging the two edges with aid of the first set of retention structures and the second set of retention structures. In some embodiments, the lead-in feature and the retention feature are configured to guide at least one of the plurality of inter-connecting features formed on the second edge into a pre-defined slope during the engagement of the two edges. In some embodiments the predefined slope aligns the interconnecting tab feature to pass through the slot feature of the opposing shell. In some embodiments, the retention feature is made of a flexible material. In some embodiments, the deflection feature is configured to deflect at least one of the plurality of inter-connecting features formed on the first edge to a pre-determined deflection level so as to reduce friction during the engagement of the two edges.

In a separate yet related aspect, an apparatus for integrating a container is provided. The apparatus comprises: a first set of retention structures to be associated with a plurality of inter-connecting features formed on a first edge of the container, wherein at least one of the first set of retention structures comprises a lead-in feature and a retention feature; a second set of retention structures to be associated with a plurality of inter-connecting features formed on a second edge of the container, wherein at least one of the second set of retention structures comprises a deflection feature and the retention feature; and an actuation unit configured to drive a relative movement between the first set of retention structures and the second set of retention structures for engaging the first edge of the container with the second edge of the container. In some embodiments, at least a subset of the first set of retention structures or the second set of retention structures are removable. In some embodiments, the apparatus is configured to accommodate another container of a different length by removing a subset of the first set of retention structures or the second set of retention structures.

In another aspect, the present invention provides methods to integrate or assemble molded pulp, fiber or paper shell containers that do not comprise a liner. In this case, the container can be of highly recyclable single material which can be compostable and/or recyclable. In another aspect, there may be a fitment for engaging a cap or cover but with no liner. In some cases, this container may be used for holding powders, particulates or other materials.

In another aspect, the present invention provides a method for integrating a high barrier or water proof container comprising one of the many forms of liners, liners with attached fitments, single part liners with integral fitment features, or coatings that are encapsulated by mechanically inter-connecting pulp shells. Accordingly, the outer shell can be separated to be recycled and the plastic liner can be disposed or recycled as applicable.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
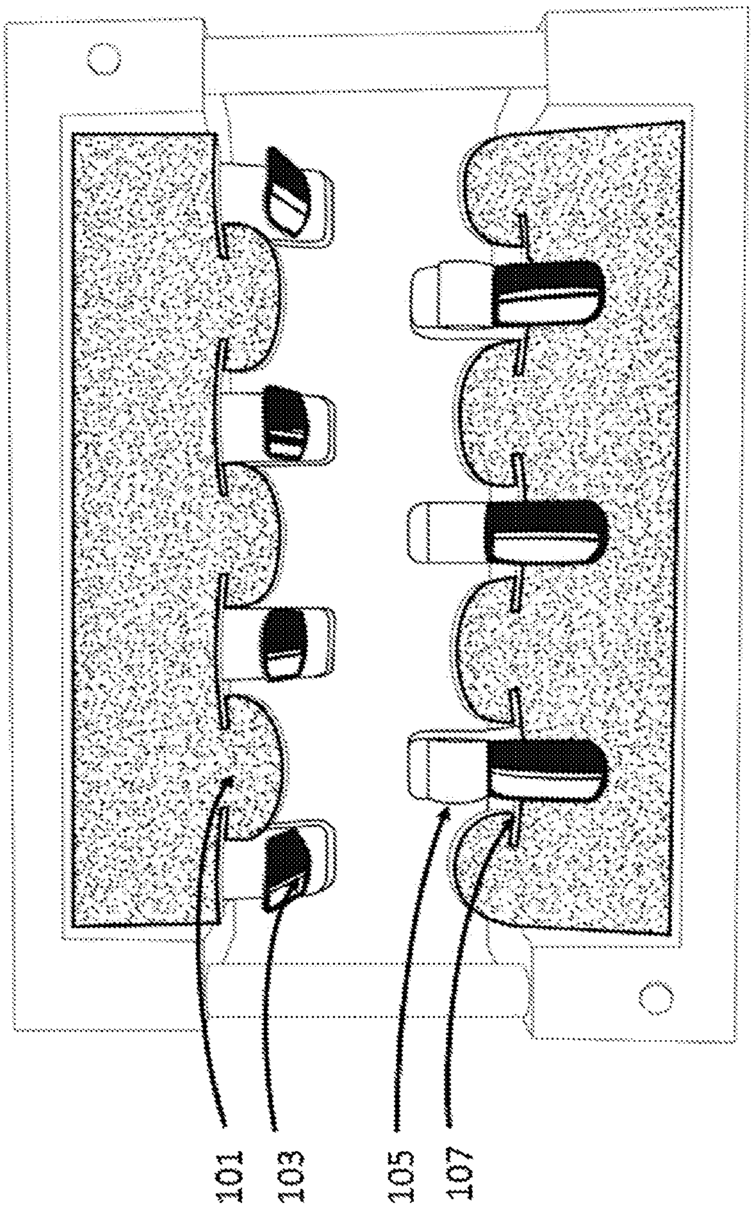
FIG. 1 provides an exemplary integration of a fragment of two container pieces comprising an exemplary inter-connecting structure.

In the following detailed description, numerous specific details are set forth in order to provide a thorough understanding of the invention. However it will be understood by those of ordinary skill in the art that the invention may be practiced without these specific details. In other instances, well-known methods, procedures, and components have not been described in detail so as not to obscure the invention. Various modifications to the described embodiments will be apparent to those with skill in the art, and the general principles defined herein may be applied to other embodiments. The invention is not intended to be limited to the particular embodiments shown and described.

The invention described herein provides methods and systems for connecting multiple parts of a container with inter-connecting features to form a uniform singular structure. The methods and systems can also be used for joining a single-piece shell together over an open side. For instance, a hinged shell that is connected along a hinge may be closed or connected by the provided methods or systems over an open side comprising the inter-connecting features. In some embodiments, the inter-connecting features are the same as the features described in U.S. Patent Application Ser. No. 62/323,388 which is incorporated by reference herein. The provided systems and methods may be adapted for containers made of various materials, dimensions, shapes, number of parts to be connected and the like. The systems and methods provided herein may allow for an efficient assembling of shell parts with inter-connecting features without forming a permanent deformation or crease of the inter-connecting features thus weakening the assembled container.

The containers described herein can be used for the delivery and/or storage of materials for human consumption or for the delivery of other materials not for human consumption. In some cases, the contained materials can be solid such as powders or granules, tablets and other particulates. In other cases, the contained material can be liquid. In these cases, the container may further comprise a liquid-holding vessel or bag. Examples of materials that can be contained include beverages, syrups, concentrates, soaps, inks, gels, solids, and powders.

In some embodiments of the invention, the container may have a fiber or pulp-molded body. The fiber and pulp-molded body can be a hollow shell comprising two or more pieces connected together. One or more edges that is formed of two sides of the two or more pieces of the shell may be securely connected via inter-connecting features. In some cases, the hollow shell may be a single-piece shell connected along a hinge. The single-piece shell may be closed over an open side comprising one or more inter-connecting features. The inter-connecting features may be located at the perimeter of the molded shell where mating to another shell part. The mating shell may have similar or dissimilar features for the inter-connecting based engagement between shells. The inter-connecting features are engaged such that they are internal to the assembled containers. This results in the exterior of the container in the connecting region having a relatively smooth container exterior.

FIG. 1 provides an example of a fragment of two container pieces comprising exemplary inter-connecting features integrated by an exemplary apparatus. The apparatus comprising a plurality of retention structures 103, 105 may be used to assist integration of two or more shell parts. Shell parts, shell pieces, and pieces may be used interchangeably throughout this paper. As shown in FIG. 1, the two shell parts to be joined may comprise a plurality of inter-connecting features respectively. A plurality of inter-connecting features 101 are disposed along an edge of a first shell part and a plurality of inter-connecting features 107 are disposed along an edge of a second piece second shell part. In some cases, the inter-connecting feature may comprise a tab portion and a slit/slot portion. The tab portions of the first set of inter-connecting features 101 can be designed to be inserted through a plurality of mating lineal slit portions of the second set of inter-connecting features 107 to form a secure locking configuration.

Various properties of the inter-connecting features and/or the container parts may affect the integration process. For instance, design of the inter-connecting features (e.g., tab features and slit/slot features) in size, arrangement, pitch, spacing and shape may be adjusted to assist an insertion with reduced friction or interference during engagement process and a tight fit after engagement. Accordingly, the system and method may be configured to be adapted for the various inter-connecting features.

The inter-connecting structures may have a variety of shapes, configurations and/or dimensions. For example, the tab portion of the inter-connecting features may have a mushroom shape, semi-circular shape, arrow type, hook-shapes, L-shapes, Y-shapes, T-shapes, triangular or diamond shape. The shape of the tab portion may or may not be symmetrical. The tab portion may have a centered or off-centered leading portion that is used for guiding insertion of the inter-connecting tabs through the complimentary slits may affect the range of entering angles during engagement. Similarly, the pitch and shape of the slits portion may be designed to match the location of the mating tab portions. The profile of the slit feature may have various shapes, such as straight line, wavy, or a concave curve.

In some case, the inter-connecting tab features may be slightly deformed when it is passing through the inter-connecting slot or slit features. Additionally or alternatively, when the inter-connecting tab features are entering the mating slot or slit features, the slot or slit features may be opened to a certain extent for receiving the tab features with minimum interference. Once the inter-connecting tab feature passes through the slit or slot opening, the undercut portion of the tab feature may spring back to form a lock between the two shell pieces. To reduce or avoid forming a permanent deformation or crease, the integration system may comprise a plurality of retention structures to assist the integration process.

As illustrated in FIG. 1, the plurality of retention structures 103, 105 may be initially aligned with the plurality of slit or slot portions of the inter-connecting features. The plurality of retention structures may be provided for each of the two shell parts to be connected. In some cases, a set of retention structures may be associated with a side of shell part to be joined. A set of retention structures may comprise one or more retention structures 103 or 105. A set of retention structures provided for a side may or may not be arranged in an array. The set of retention structures may or may not be arranged in a straight line. The set of retention structures may or may not be evenly spaced. In some embodiments, locations or arrangement of the retention structures may be designed to fit with locations of the plurality of inter-connecting features. The retention structures may be configured to retain at least one of the two shell parts in a proper position. The retention structures may hold the shell part in place by clamping a portion of the shell part. For instance, the retention structures 105 may retain the plurality of slot portions of the inter-connecting features 107. The retention structures may prevent the shell part from moving relative to the apparatus. In some cases, the retention structures may retain both sets of the inter-connecting features in position. The retention structures may have any suitable positions relative to the shell parts. The retention structures may or may not be taller that the shell that they retain.

Figure 1A:
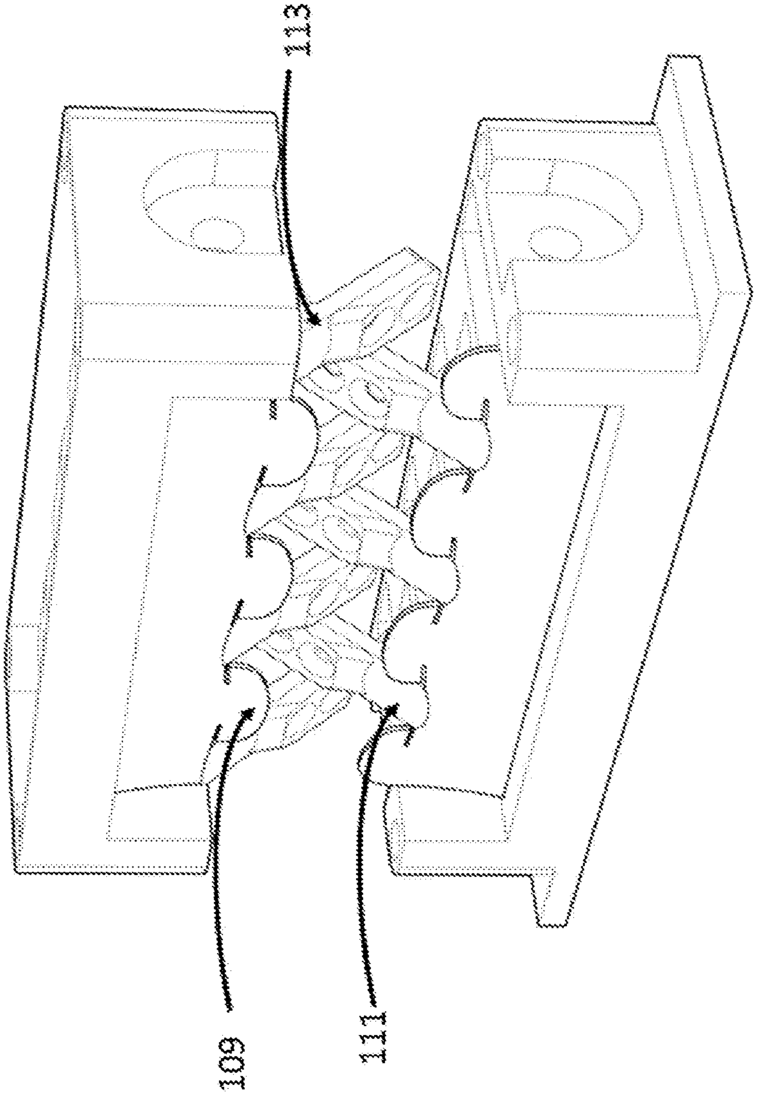
FIG. 1A illustrates another view of the integration of a fragment of two container pieces.

FIG. 1A illustrates another view of the integration of a fragment of two container pieces. In some cases, as the tab features 109 approaching the mating slots, the retention structures 111, 113 may be configured to automatically adjust the orientation of the retention features relative to the shell part and move into a desired slope or angle for guiding the insertion of the tab features. The movement of the retention structures 111 may or may not be configured to coordinate the approaching movement of the tab features 109. In some cases, mechanical structures or mechanisms such as links or shafts may be used for coordinating the movements and can be located support the one or more retention structures 113.

Figure 2:
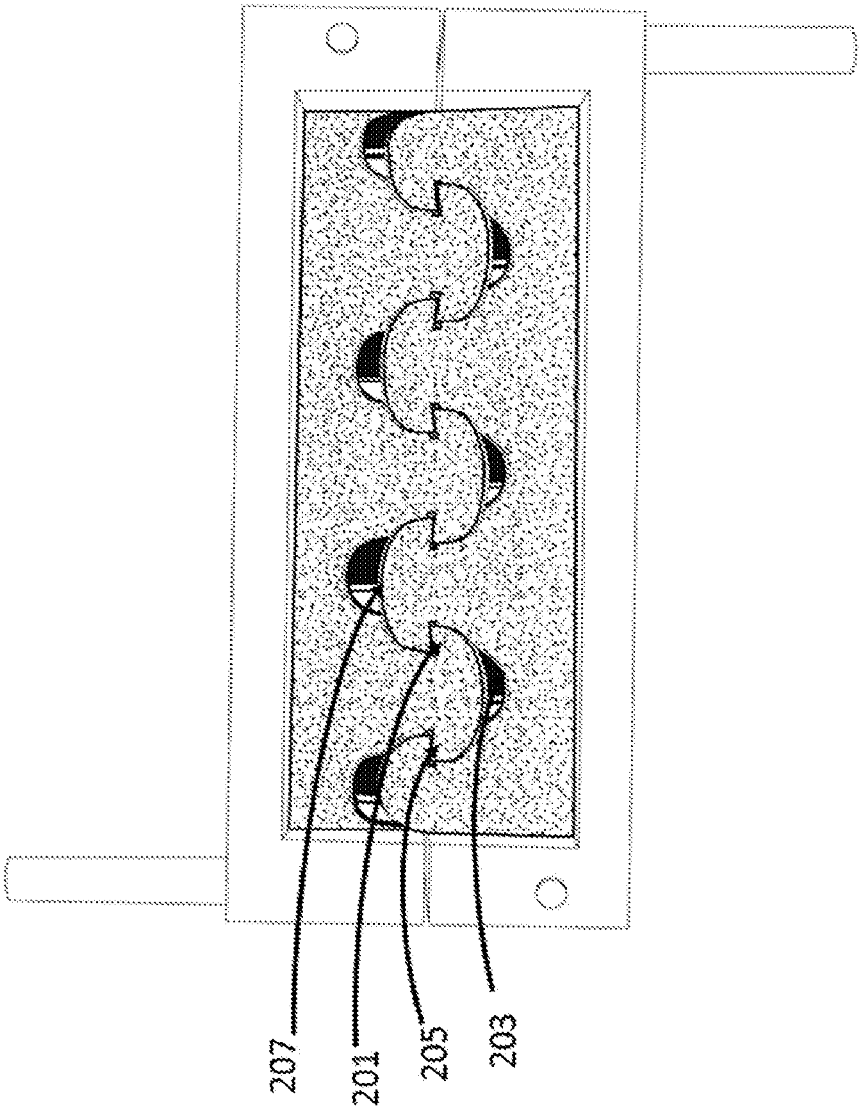
FIG. 2 illustrates an exemplary configuration after two mating sets of inter-connecting features are engaged.

FIG. 2 illustrates an exemplary configuration after two mating sets of inter-connecting features are engaged. As shown in FIG. 2, after movement of the inter-connecting tabs from one part of the shell into the complimentary slits in a direction not aligned with the plane of the mating part, the inter-connecting tabs may flex back to an inner surface of the shell part. Once the inter-connecting tabs completely spring back, or are forced back, they may be in a locked configuration. As shown in FIG. 2, the engaged inter-connecting features are formed close to an inner surface of the container shell. The plurality of retention structures may or may not be visible after engagement of the inter-connecting features. Two sets of the retention structures associated with the two sides of the shell parts may be in an interleaved configuration after the inter-connecting features are engaged. In some cases, the two sets of retention structures in the engaged configuration may not interfere with each other or in contact with each other. The retention structures 203, 207 may guide the inter-connecting tabs 201, 205 insert into the mating slits. In some cases, a set of retention structures associated with a connecting side may guide the approaching inter-connecting tabs of the opposing connecting side to insert into the slots aligned with the set of retention structures. In some cases, a set of retention structures associated with a connecting side may be configured to deflect the approaching inter-connecting tabs of the opposing connecting side in order to open the slots or slits of the opposing side.

After engagement, the retention structures may retract from the engaged inter-connecting structures without disrupting the locked configuration. As mentioned above, as the two sets of retention structures are not interfered with each other after engagement of the inter-connecting features, when the apparatus moves back to its original position, the two sets of retention structures may move back to an original location or retract from the locked shell parts without interfering with each other or the locked inter-connecting features. In some cases, if the assembly machine comprises multiple stations, withdrawal of the retention structure can be timed to release the assembled container at a desired time and location. The withdrawal motion may be automatically controlled such that it may coordinate with the motions of the retention structures and the engagement process.

In some embodiments, each inter-connecting tab is guided by a retention structure aligned with the mating slit or slot in the mating shell part. The plurality of retention structures may or may not be evenly spaced. The dimension or layout of the retention structure may be designed to accommodate the inter-connecting features. In some cases, the retention structure may have a width smaller than or identical to the width of the slit or slot.

In some embodiments, the plurality of retention structures may be designed to accommodate the inter-connecting features having variable shapes. In some cases, the dimension and/or shape of the inter-connecting tab/slit features may be varied according to the curvature or contour of the container shell. For instance, wide inter-connecting tab features may be located along a straight side and narrow inter-connecting tab features may be located along a curved side, such as shoulder or corners of the bottle. Accordingly, the retention structures may be designed to fit with a size or dimension of the variable tab/slot features. In some cases, the retention structures may have a width smaller than a width of the tab or slot features such that the same retention structures can be used to guide and retain the shell part with a wide range of inter-connecting features. Alternatively, the retention structures may have a width identical to the width of the slot or slit feature. The location or spacing of the retention structures needs not be associated with the shape of the tab features. The location or spacing of the retention structures may be associated with the pitch or location of the inter-connecting features relative to the shell part. Accordingly, the same set of retention structures may be used for container piece having one, two, three or more different shapes and/or sizes of inter-connecting features.

The retention structures may guide the a shell part's inter-connecting tab features insert into the opposing shell part's mating slit or slot features. The retention structures may assist positioning the shell parts such that the tab features and the slit/slot features are aligned and engaged at certain angle or slope. The retention structures may also assist deflecting the inter-connecting features to certain extent or deflection level to reduce friction or resistance during inserting process.

Figure 3:
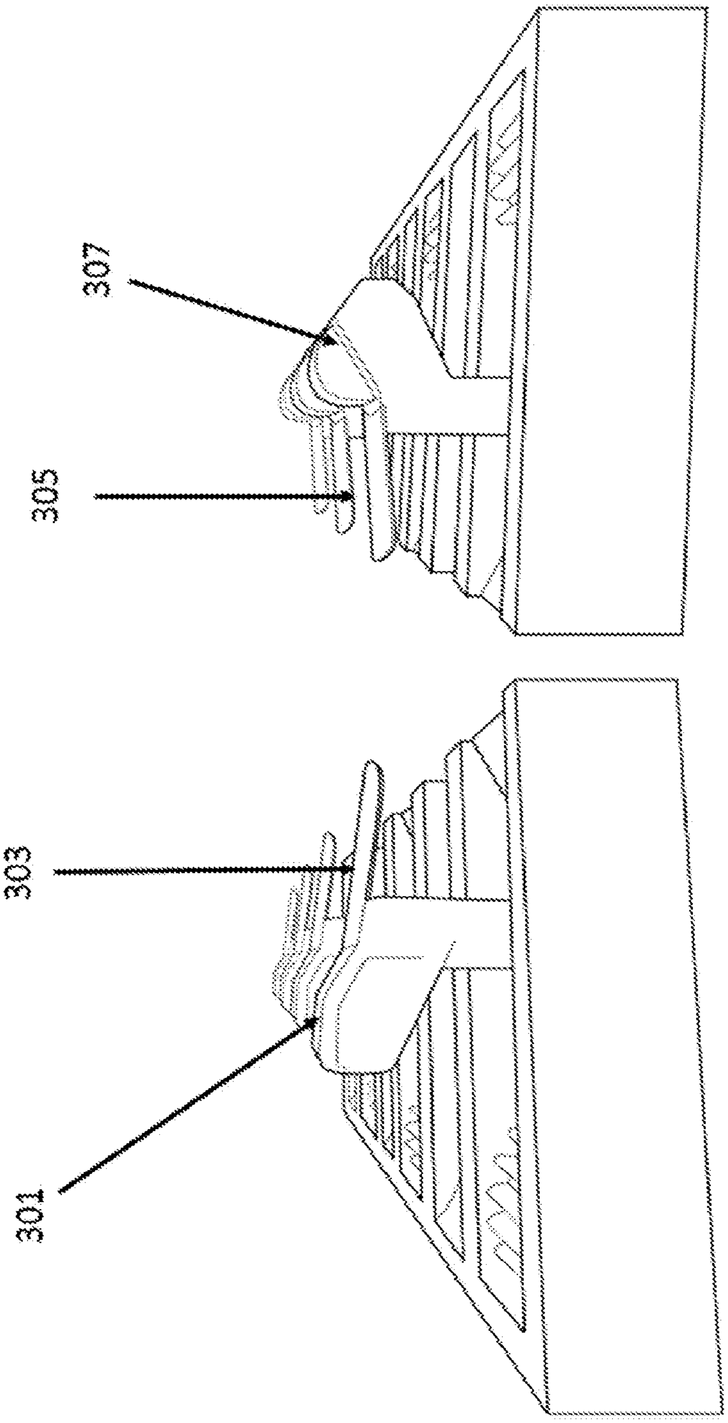
FIG. 3 illustrates examples of retention structures of the integration device or system.

FIG. 3 illustrates examples of retention structures of the integration apparatus or system. The retention structure may comprise a guiding and retention feature 303, 305. In some embodiments, the guiding and retention feature may be in the form of a thin blade. The guiding and retention feature is configured to guide the approaching tab feature insert into the mating slot from a desired entering angle or a desired entering slope. The tab feature may be deflected and guided into the desired entering slope or entering angle. The deflection may be beneficial to avoid colliding of the opposing tab features. The blade can be shaped and sized to assist opposing tab deflection. In some instances, the blade may also be designed to ensure that an internally assembled liner is not damaged by the blades. For example, material or surface finishing of the blades can be selected such that it may not damage the liner.

Figure 10:
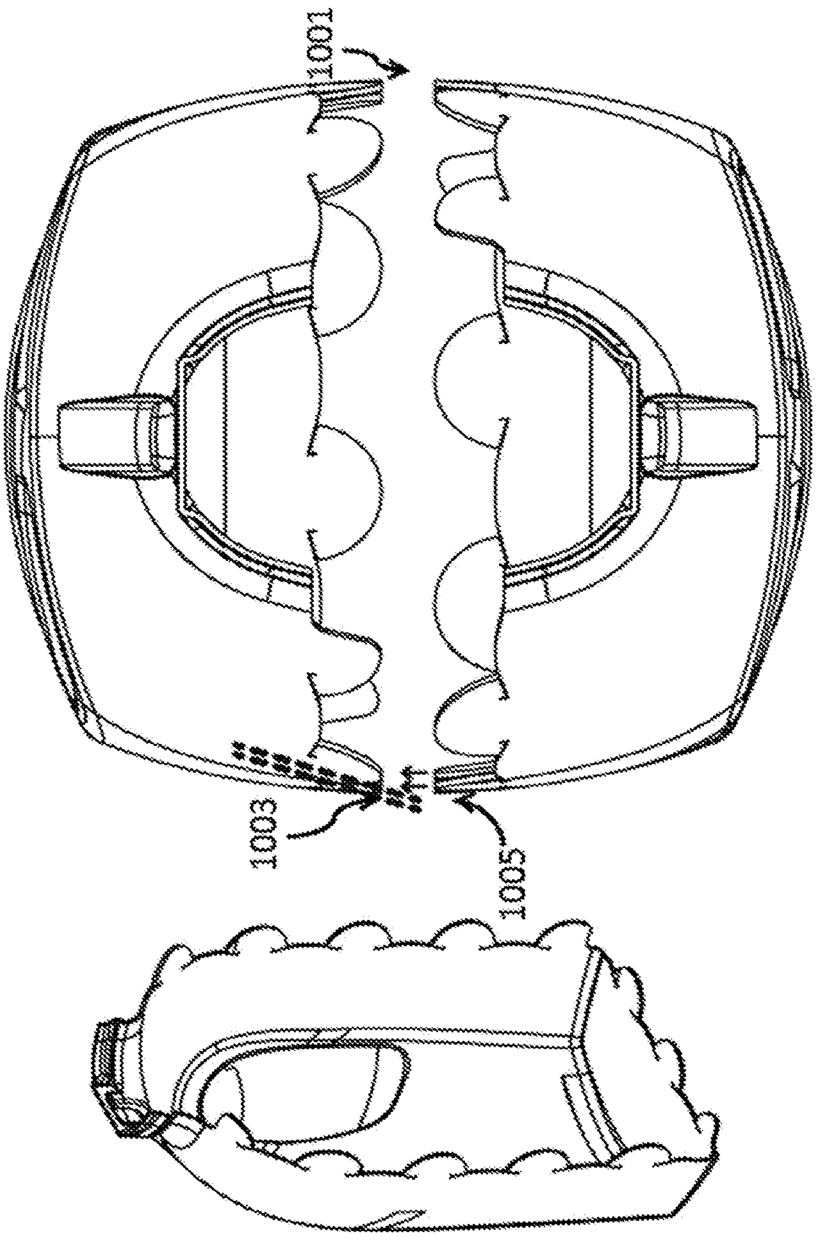
FIG. 10 shows an example of two parts with retention features arranged in intervals for connecting two parts in respective cavities.

As illustrated in FIG. 10, the natural molded angle of the formed tabs 1001 would result in an impact as the shell approach. For instance the tab features may collide and not be guided into slots to rest internally to the assembled container. When the tab features are deflected to a desired angle or slope 1003, the entering tabs of the opposing shell part may be guided into the slots of the shell part where the tab features are deflected 1005. The entering angle during engagement of the locking features may alternate based on the various characteristics of the shell parts to be joined together. The various characteristics may include, for example, shape of the inter-connecting tabs, thickness of the inter-connecting features, opening of the slot/slit, and the like.

The guiding and retention feature may be flexible. The guiding and retention feature may be able to flex to allow for a withdrawal of the blade without damaging the integrated or closed container. The guiding and retention feature can be made of any suitable materials such as metal blade or flexible plastic. The guiding and retention feature may have various shapes such as finger shape, rectangular, triangular, and the like. The guiding and retention feature may have various dimensions. In some cases, a width of the thin blade may be smaller than the width of the corresponding slot feature such that the retention feature is able to retain the shell part at the slot portion. The thin blade may have a range of length. The length of the thin blade may affect a travel distance of the integration process. For example, when the thin blade is shorter, the retention structures may travel less distance in order to engage, or retract. The requirement of less distance can result in an increase of assembly speed.

In some embodiments, the retention structures may comprise a lead-in feature 301. The lead-in feature may be configured to guide the approaching tab features into a desired slope defined by the thin blade. The lead-in feature may have a low-profile. In some cases, the lead-in feature may have a surface extending from the thin blade plane. In some cases, the blade may be attached to the lead-in feature. The lead-in feature may be fabricated using any suitable fabrication method such as injection molding or three-dimensional printing. The lead-in feature can be formed of any or a combination of materials such as polymer, plastic, metal and the like. The lead-in feature can be attached with various known methods such as snap fit or mechanical fasteners. In some cases, the lead-in features may not require attachment and be formed integrally with other features of the retention structure.

In some cases, the retention structures for a pair of integrated sides are identical. In some cases, the retention structures for the two mating sides are different. In some embodiments, retention structures on one side may comprise a guiding and retention feature 303, 305 and a lead-in feature 301, while the retention structures on the mating side may comprise a deflection feature 307 instead of the lead-in feature. The deflection feature may be configured to gently deflect the approaching tab features of the mating shell part to certain extent such that the integration is performed with reduced friction. In some cases, the deflection feature may comprise a roller. The deflection feature may comprise any other configuration or structures such that the tab features can glide over the deflection feature then bent to a desired angle or amount. The deflected tab features may allow for the slots be opened to certain extent for receiving the mating tab features with minimum interference.

The amount of deflection may or may not be the same according to different inter-connecting features. In some cases, the amount of deflection may be adjusted according to a dimension, shape, size, thickness, arrangement, pitch, spacing, or materials of the inter-connecting features. The amount of deflection may be adjusted by adjusting a profile of the deflection feature. For instance, the higher the deflection feature relative to the plane of the approaching inter-connecting features, the greater the amount of deflection. The deflection angle may be in the range, for example from 1 degree to 50 degree.

In some embodiments, the retention structures may comprise a deflection feature and a retention feature. The retention feature can be the same retention and guiding feature as describe above. The retention feature may be mainly used for retaining the shell part in position while it is inserted into the mating shell part. In some embodiments, the retention structures may comprise a lead-in feature and a guiding feature. The guiding feature can be the same as the guiding and retention features as described above. The guiding feature may be mainly used for guiding the approaching tab features insert into the mating slots from a desired angle or slope. In some embodiments, two shell parts to be integrated are associated with the retention structures with the above described different features respectively such that only one shell part has the tab features deflected during integration. Alternatively, both shell parts may be associated with identical retention structures.

Figure 4:
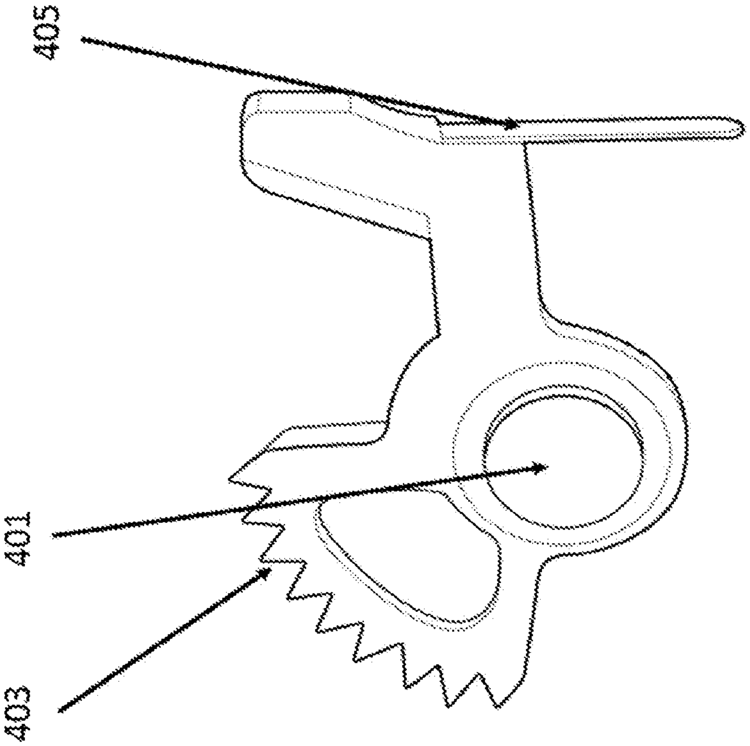
FIG. 4 illustrates another view of the retention structure.

FIG. 4 illustrates another view of the retention structure. In some embodiments, the retention structures may be rotatable about a pivot axis 401. This may allow for leading the approaching tab features insert into the slots from a slope at varied angles. In some cases, the angle or slope may be associated with an amount of deflection of the mating tab features. The retention structures or deflection features 405 may be able to rotate continuously or at discrete angles. In some cases, the angle may be discrete. For instance, gears 403 can be used to pivot the retention structure about a pivot to set the various discrete angles and drive its range motion. The retention structures may also be rotated to switch between a shell loading mode and integration mode. For instance, the retention structures may be rotated to a position to receive a shell part and once the shell part is in position, the retention structures may be rotated to clamp down and retain the shell part. In another example, the rotational movement may be continuous or in accordance with an approaching movement of the inter-connecting features. For instance, the retention structures may be rotated to varied positions during the engagement so as to ensure a smooth insertion of the approaching tab features. The rotational movement of the retention structures may be automatically controlled. Any suitable actuators may be used to drive the rotation movement. For example, the actuators may be electric motors, solenoid actuators, hydraulic actuators, or pneumatic actuators.

System and method may be provided to accommodate for inter-connecting features located in varied locations of the shell part. A plurality of inter-connecting features may be disposed along an edge of a piece of the container. The plurality of inter-connecting features can be located anywhere on the shell piece. The inter-connecting features may be formed on the bottom, top, sides of the container. The inter-connecting features can be formed along an entire side of a shell piece or a portion of the side. For example, the inter-connecting features can be formed only on the lower half of the edge and the upper half of the edge can be connected through other connecting means. It should be noted that various combination of connecting means can be used for connecting multiple shell pieces, even on a single side. For instance, a portion of the side can be connected using adhesion and another portion can be connected using the described interlocking features. In other instances, other attachment means such as heat sealing, adhesive or non-adhesive tape, sealing wax or snaps can be used in addition to the described inter-connecting method to provide additional sealing or connection. However, when no other materials included in the container, the described method and system provides an integrating method for forming a highly recyclable single material container which can be completely compostable and/or recyclable.

Figure 5:
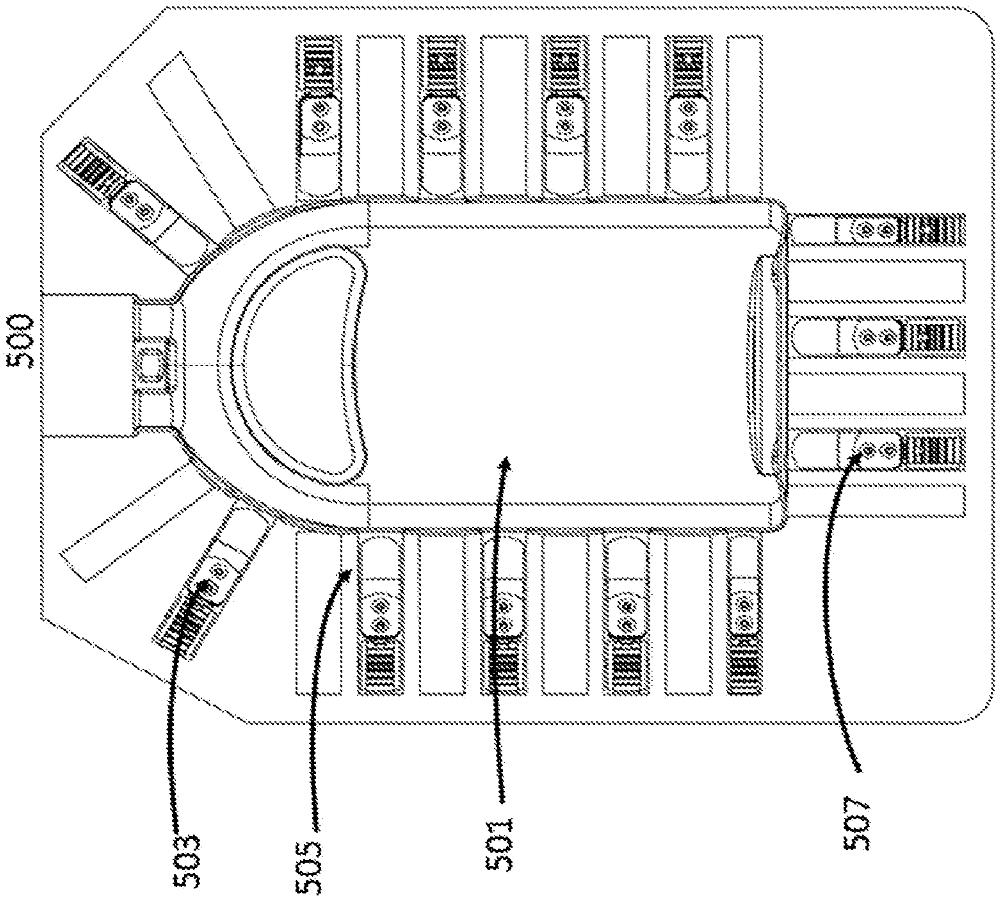
FIG. 5 illustrates an example of a device for integrating two or more shell parts via inter-connecting features.

FIG. 5 illustrates an example of an apparatus 500 for integrating two or more shell parts via inter-connecting features. The apparatus 500 may comprise one or more cavities 501 for receiving one or more shell parts. The cavity may have a shape or dimension to accommodate the shell part. In some embodiments, the cavity may be configured to accommodate shell parts of different dimensions or shapes. For instance, shell parts with different inter-connecting features may use the same cavity. In another instance, shell part with different dimensions may use the same cavity. A profile of the cavity may or may not compliment the exact shape or dimension of the shell parts. When the shell part is not in complete fit with the cavity, the plurality of retention features may help to retain the shell part in place. The cavity may be designed to accommodate various shell parts. The cavities may or may not have equivalent size or dimensions when associated with two mating shell parts. For instance, one shell piece can be of greater portion of the body structure than the other shell piece. In this case, the two cavities may have different shapes or sizes. A container shell can be joined together along any direction on any surface. For example, the two-piece shell can be a top half and a bottom half that are joining each other not along a side parallel to the longitude axis of the container. Accordingly, the cavity may have an internal profile to accommodate the top and bottom shell piece respectively. Alternatively, a different cavity may be used for different shell parts and/or other components of a container such as handles, hang straps, carry straps, fitment, blow molded liners, polymer film liners, caps, lids, bases parts and the like. A device may comprise one cavity. Alternatively, a device may comprise two or more cavities. A device may comprise more than one cavity for receiving different shell parts or components of a container.

The device may be designed for integrating shell parts with inter-connecting features located at varied locations. The inter-connecting features may be located anywhere of the container, such as the shoulder, neck, sides, corner and bottom of the container. Accordingly, one or more retention structures may be disposed in the corresponding location relative to the cavity to assist integration of the inter-connecting features. For example, retention structure 503 may be used for guiding and retaining of inter-connecting features located in the shoulder of the container, retention structures 505 may be used for the inter-connecting features located on the side of the container, and retention structures 507 may be used for the inter-connecting features located at the bottom of the container. Gears can be used to transfer mechanical energy for the motion of the retention structures. Any other suitable mechanical transmission mechanisms can be used to transfer the actuation force from the actuation unit to the retention structures.

Figure 11:
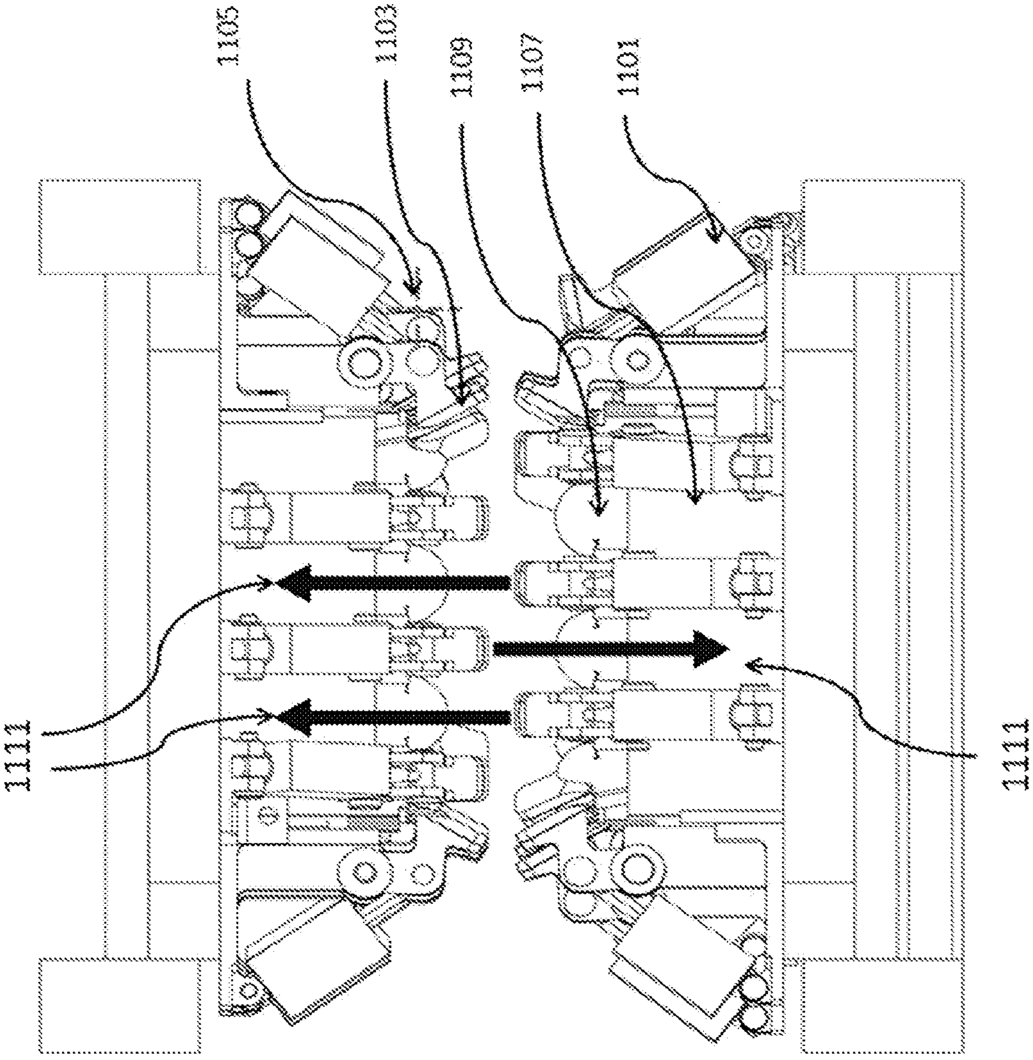
FIG. 11 shows and exemplary view of an apparatus with a device loaded with shell parts.

FIG. 11 shows another view of the device loaded with shell parts. Groups of retention structures may be driven mechanically and move together as indicated by the arrows 1111. The movement may be actuated by one or more actuators 1101. Any suitable actuators may be used to drive the rotation movement. For example, the actuators may be electric motors, solenoid actuators, hydraulic actuators, or pneumatic actuators. Actuators may In some cases, rotational movement of the retention structure 1103 may also be actuated by the actuation unit. The retention structure may be driven to rotate about a pivot axis 1105. The retention structure may be rotated into different positions between a shell loading mode and integration mode. The plurality of tabs 1109 may be interspersed with the interleaved retention structures.

The device may comprise any number of retention structures to accommodate the inter-connecting features of the shell part placed in the cavity. In some cases, each slot or slit structure corresponds to a retention structure. Similarly, in some cases, there is a guiding retention feature opposite each formed tab feature. Retention structures can be located between formed tabs. In some cases, retention structures may be selectively used for some of the inter-connecting features. For instance, inter-connecting features with different pitches may use the retention structures with the same pitch or spacing, in this case, the high-pitched inter-connecting features may not have every slit or slot associated with a single retention structure.

In some embodiments, the spacing or pitch of the retention structures may be adjustable such that the device may accommodate different layout of inter-connecting features. The retention structures may have a combination of different pitches to accommodate the pitches of the shell parts. In some embodiments, the retention structures may be modular. In some embodiments, a part of the device is modular. For instance, a bottom portion, side wall, shoulder portion, or neck portion of the device is modular such that it can be removed, added, or replaced by other portion with different retention structures. The number of the retention structures can be adjusted by adding or removing retention structures in the related location in a modular manner. In some cases, the pitching, spacing or location of the retention structures may be adjusted by selectively rotating the unused retention structures to a position such that the unused retention structures may not interfere with the integration process.

In some embodiments, the system and apparatus may allow for the assembly of shell parts to run at a high rate of speed. The system or apparatus may be automated or semi-automated. For example, movement of the apparatus parts and retention structures may be automatically actuated by one or more actuators controlled by the system. In some cases, the apparatus may be used to assist a manual assembly of the shell parts. The cycling of such apparatus or system may be, for example, at least 20, 25, 30, 35, 40, 45, 50, or 60 cycles per minute. A container may be assembled at one or more stations and in each station, different shell parts may be assembled to form the final container. In some embodiments, a station may comprise one or more apparatuses or devices for integrating the shell parts. Different stations may comprise devices with different cavities for receiving and connecting different shell parts or functional parts of the container.

Figure 6:
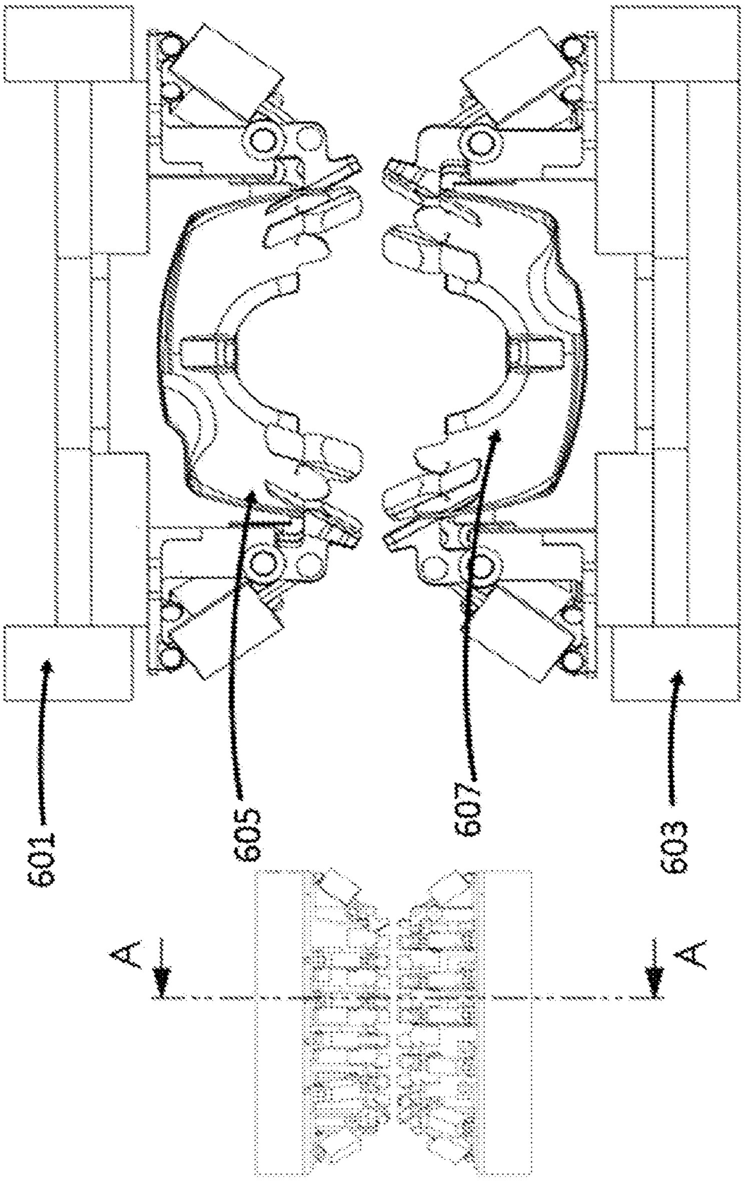
FIG. 6 shows an exemplary apparatus comprising two parts for connecting two shell parts with inter-connecting features.

The device may comprise two or more parts corresponding to two or more shell parts to be connected. FIG. 6 shows an exemplary device comprising two parts 601, 603 for connecting two shell parts 605, 607 with inter-connecting features. As illustrated in the figure, a shape of the cavity needs not completely fit with a shape of the shell part. The shell parts may be retained in place by a plurality of retention structures of the device. As shown in FIG. 11, the device may comprise upper and lower parts where the multiple retention structures are spaced at intervals where there is a space between adjacent retention structures. The retention structures may or may not be taller that the shell that they retain. As the two parts of the device close together as indicated by the arrow, the shells are brought together and the retention structures of the upper part bypass the retention structures from the lower part. The retention structures may be arranged to rest in the space between those retention structures of the opposing parts of the device.

In the loading mode, the cavities may be in an open configuration and the shell parts may be placed into the cavities 1107. The slits or slots features may be aligned with the plurality of retention structures and held in place. The two or more cavities can be arranged in any position. For example, the cavities may be disposed horizontally facing each other or vertically. Referring back to FIG. 6, next, during engagement, the two parts of the device 601, 603 may move towards each other. In some cases, one part of the device is moving. In alternatively cases, both parts are moving towards each other. After the inter-connecting features are engaged, the two parts of the device may retract the retention structures from the locked structures by moving back to the loading position. The travel distance of the two parts of the device may be associated with the dimension of the retention structures as described elsewhere herein, for example, shorter retention structure may require less travel distance. In some cases, additional mechanism may be used to further assist the retention of the shell part. For example, vacuum in communication to orifices in the cavity surface can be used to retain the shells or containers into the cavities. Retention of shells, especially if they are in an upper cavity is important. It is useful to hold the shell parts in place when they are in the upper cavity. Similarity, positive pressure can be used to eject shells or containers from the cavities. Shells can be initially retained in the cavities by vacuum as retention structures are in their open position and then by the retention structures can move to the retaining and closed position.

In some cases, the engagement movement of the to-be-joined shell parts may be a translational movement. A plurality of inter-connecting features in varied locations of the shell part may be moved to be engaged along substantially the same direction. In some cases, the inter-connecting features may be located on an edge with varied curvatures. In this case, design of the shapes of the tab features according to the different locations may allow for the translational engagement movement. The simplified movement may be beneficial for increasing the assembly efficiency. In some cases, the two shell parts to be connected may remain parallel to one another during engagement movement. In some cases, one shell part may be oriented relative to the other during engagement movement and the orientation angle may or may not change during the engagement movement. In some cases, a trajectory of the integration movement may be substantially tangential to the connected surface of the container. In other cases, the trajectory of the integration movement may not be linear or a straight line. The movement may have an arc, curve or any other trajectory for engaging the inter-connecting features at a desired angle.

Movement of the device parts may be actuated by one or more actuators. Any suitable actuators can be used for driving the movement. For example, the actuators may be electric motors, solenoid actuators, hydraulic actuators, or pneumatic actuators. Alternatively, the movement may be driven manually. A speed of the movement of one part of the device relative to the other may be controlled to ensure an improved integration performance. The speed of integration movement may be related to various factors of the shell parts to be joined together, such as materials, characteristics of the inter-connecting features including but not limited to sizes, shapes, pitches, location and the like.

The device may be used for connecting inter-connecting features for one or more edges of the shell parts concurrently. FIG. 6 illustrates two sides of the shell parts are connected concurrently. In some cases, only one side of the shell parts is connected at a time. For instance, a single-piece shell in a clam configuration may be closed or connected on the open side. In some cases, three of more sides of the shell parts may be connected concurrently. Alternatively, multiples sides of the shell parts may be connected sequentially. For instance, one side of the container may be connected first to form an open clam configuration and the second side is then connected for closing the container.

The device can also be used for connecting shell parts with other mechanical connecting features. The other mechanical connecting features may include, for example, flange, lug features, overlap flaps, hinged overlap flaps and the like. For instance, the mechanical connecting features at the bottom portion of the container may be overlap flaps. In some cases, a connected edge may comprise various combinations of attachment means. Multiple parts of the container need not be joined together having the inter-connecting features along the full length of the joining edges. For example, a joining edge may have inter-connecting interlocking features on a portion to form a smooth mechanical connection, while the other portions may be joined by other types of mechanical connecting features such as flange, lug features, overlap flaps, hinged overlap flaps and the like.

The container shell can comprise any structural body that provides an enclosure. FIG. 6 shows the container in a cylindrical shape, however, the shape should not be limited to cylinder or symmetrical profile. The structure of the container may or may not be geometrically symmetric. The wall of the container may be of any configuration such that the contour of the wall may be straight, curve or any other profile. The provided apparatus may be configured to be adapted for the various profiles of the wall as described elsewhere herein.

Figure 7:
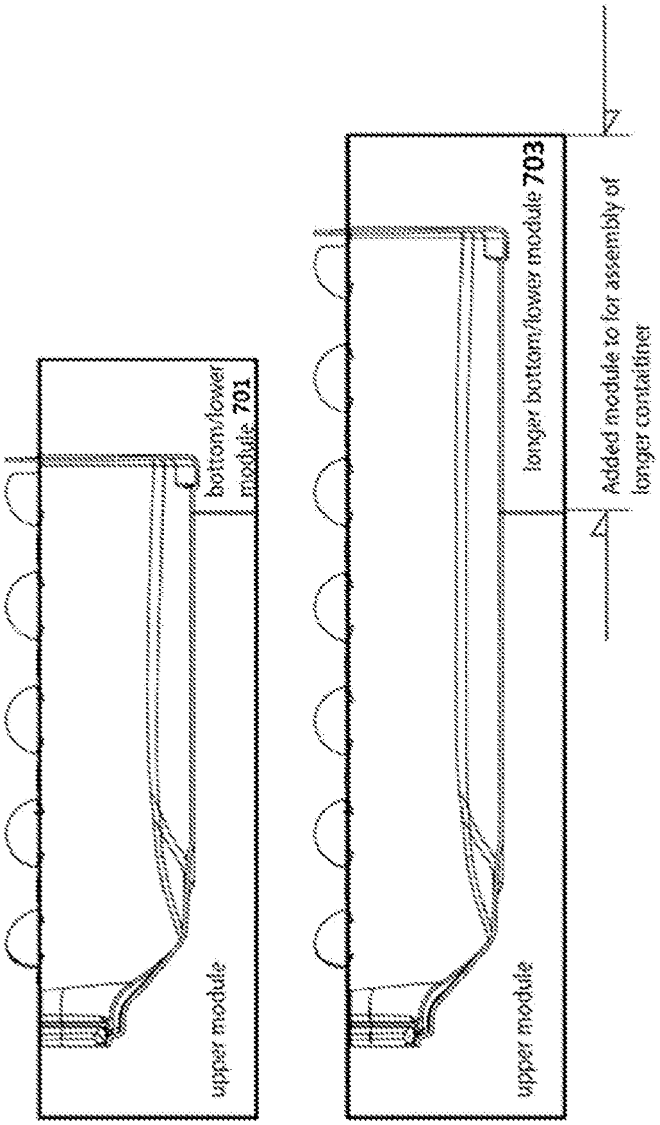
FIG. 7 shows an example of a device that is configured to accommodate shell parts with varied length.
Figure 8:
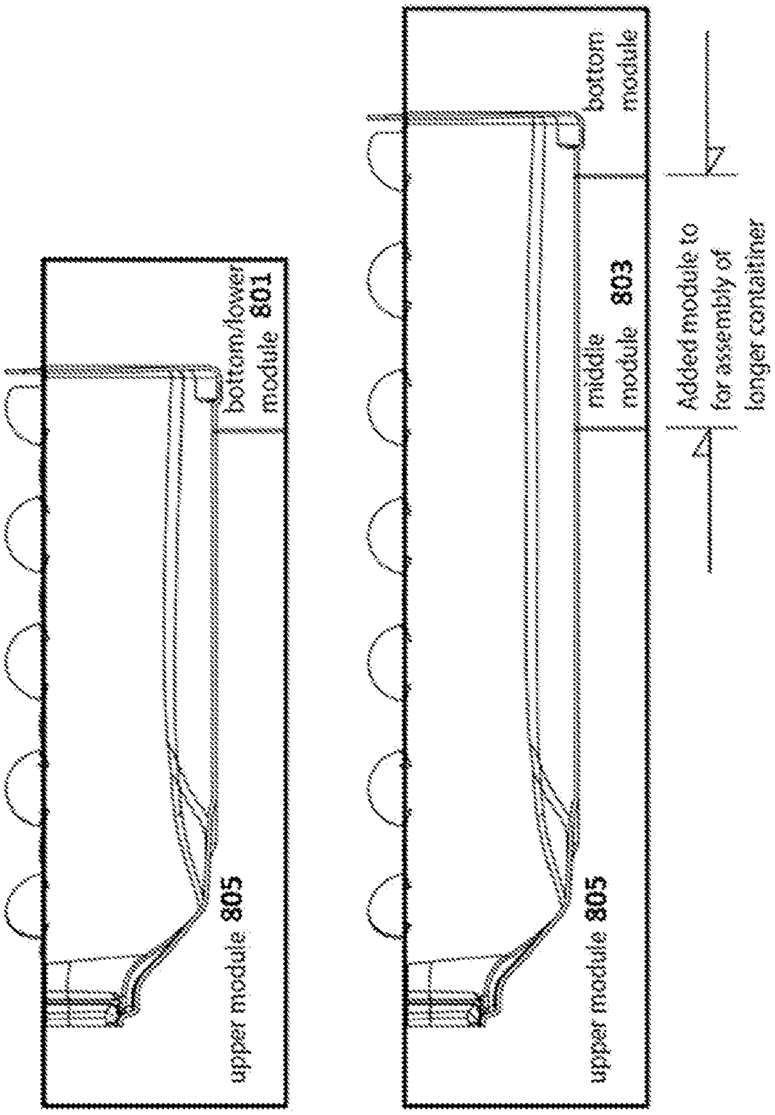
FIG. 8 shows another example of a device that is configured to accommodate shell parts with varied length.

The system and method can be adapted for integrating a variety of different shapes and sizes of container. FIG. 7 and FIG. 8 show an example of a device that is configured to accommodate shell parts with varied length. The device may comprise modular parts or modules. The device may be modular. The device may comprise one or more modules such as a bottom part, side wall part, shoulder part, or neck part that can be removed, added, or replaced by other modules. As illustrated in FIG. 7, a lower module 701 with a short length may be replaced with a lower module with a greater length 703 to accommodate with a bottle or container having a greater length. Alternatively or additionally, as illustrated in FIG. 8, a middle module 803 may be added between an upper module 805 and lower module 801 in order to accommodate a bottle or container having a greater length. In some cases, modules with different retention structures may also be replaced, added, or removed in a modular manner in order to accommodate different inter-connecting features of the shell parts. Any number of the device can be modular. Any module of the device can be removed, added or replaced with other modules. In some cases, modules may be mechanically connected to one another. For instance, the modules may be connected to one another through any suitable connection means such as screws, pins, or any other connecting structures. The modules may be releasably coupled to one another.

In some cases, in addition to using the inter-connecting features, other methods may be used to improve performance of the inter-connecting features or the container. In some cases, heat shrink film can be used to secure the neck are for retaining the fitment and stopping undesired rotation of the fitment. Similarly, tape could be used to retain features at the neck together. Heat shrink material can be used as a band or a cup at the bottom of the container to add additional retention capability to increase the drop performance of the container. In some cases, heat shrink can be used on the body of the container to retain two shell parts together. For example, adjacent tabs are deflected to be internal to the assembled container but some or all tabs are without the undercut slot features formed into the tab, thereby simplifying the tab. The shrink sleeve may be applied over a significant portion of the body to keep the mated shells together and the interleaved tabs in position to resist vertical relative motion between shells. Adhesive could be added to the select areas or tab to improve the structural performance. Tape could be applied to assist in improving the resistance to separation of the shells that the inter-connecting tabs provide. In some embodiments, integration of shell parts may comprise a combination of inter-connecting features and at least one different material connection facilitator such as glue, adhesive, contact adhesive, spray adhesive, and peel adhesive. Tape, shrink sleeves and other differential materials can be selected for their environmental characteristics that can include composability or recyclability.

In some embodiments, the provided apparatus or system may be configured to connect other components of a container. Integration can include many different functional parts including outer shells, inner shells, handles, hang straps, carry straps, film liners, fitment, blow molded liners, caps, lids, bases parts and the like. Accordingly, the apparatus may comprise cavities and retention features to match a dimension or shape of the various different functional parts. In some instances, the pulp-molded container shell may comprise molded features on the neck to accept a lid, membrane, cap, twist cap, snap cap, or even a threaded cap directly. There could be locking features molded into the pulp. There could be complimentary features in the cap to be mated with the inter-connecting features such that the cap can be fixed to the shell body meanwhile providing a through-hole access to the contents of the container. The fitment may or may not have threaded features to receive a lid. The fitment may or may not be formed from the same material as the shell body. The fitment may be formed from a material that may provide greater options for shaping or detailing than the shell body. In some embodiments, the fitment may be formed from molded or formed pulp or fiber. The cap may be formed from thermoformed pulp or fiber. A lid or cap may be provided over the fitment. The lid may be removable or replaceable. The fitment and its connection to the shell may be connected physically to reduce the forces of lid removal and installation including rotational, pulling and pushing forces. The inter-connecting tabs may contact the fitment and serve to reduce movement of the fitment due to these forces. In some embodiments, lid may be formed from a polymer-based material. The cap or lid can be formed of any material, such as a polymer, such as LDPE, HDPE, PET, PS, PP or biopolymer. A type of polymer can comprise polyethylene terephthalate (PET), high-density polyethylene (HDPE), polyvinyl chloride (PVC), low density polyethylene (LDPE), polypropylene (PP), polystyrene (PS), and other polymers. The polymer can be an FDA-approved plastic. The recycling groups can comprise plastic identification codes 1, 2, 3, 4, 5, 6, and 7. The polymer can be a post consumer recycled (PCR) version of the described polymers or a blend of PCR and virgin material. A recycling group can comprise a set of plastic or polymer types that can be recycled together using a recycling process that does not require separation of the plastic or polymer types prior to the recycling process.

Figure 9:
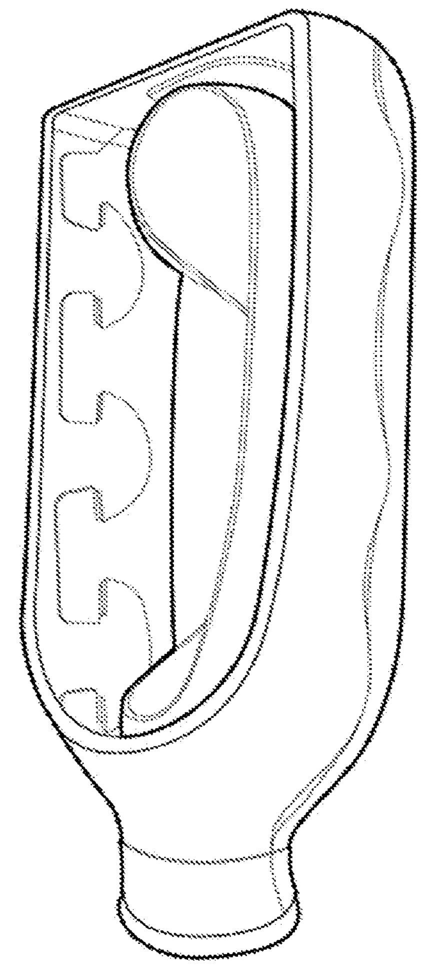
FIG. 9 illustrates an exemplary container comprising a liner and the container is connected via inter-connecting features.

The system and method may be provided for assembly of a container with or without a liner. In some cases, for a container without a liner, after engagement of inter-connecting features, other connecting means such as adhesives maybe used to seal the one or more shell parts together for sift-less purpose. In some cases, a liner may be integrated to the container. FIG. 9 illustrates an exemplary container comprising a liner and the container is connected via inter-connecting features. The liner may be a liquid-holding bag. The liquid-holding bag can be attached to the neck of the container by bonding, sealing, or welding the liquid. The blow molded liner can have a curved bottom to assist with the molding of a very thin and light weight part and require the shape of the outer shell to provide a stable bottom. The blow molded or film liner may be installed between shells for assembly and a liner loading station of the assembly device. The liner may be inserted manually, automatically by a robotic system, by mechanical device or tools. Its insertion may be timed or automatically controlled for coordination with the retention structure motions such as holding bag to the neck. The neck of the liner can engage mechanically with the shells enclosing it. The containers described herein may not require that the liner be pulled through an opening of the shell. In some embodiments, the liquid-holding bag may not extend through an opening of the shell. The containers described herein can utilize liners that are pulled through an opening of the shell. In other embodiments, the liquid-holding bag may or may not be attached to an outside portion of the shell. In some embodiments, the liquid-holding bag can be pulled through or extend through an opening of the shell during construction or deconstruction of the container, but are not be pulled or extended through an opening of the shell during filling, distribution, or use of the container. In other embodiments, the liquid-holding bag can be pulled through or extend through an opening of the shell during construction or deconstruction of the container, and are pulled or extended through an opening of the shell during filling, distribution, or use of the container.

A bag or liner can be attached to a shell using a variety of mechanisms. These mechanisms can include attachment of the bag to the shell by the fitment. The fitment can be attached to the shell through the use of heat, welding, glue, friction, snaps, locks, clips, rails, mechanical deformation, or any other mechanism known to one skilled in the art. The bag or liner can be sandwiched between assembled shells and not require other attachment mechanisms. The liner can be inserted prior to connecting the shells together in order to encapsulate the shell around the liner.

In some cases, integration of a liner may require deflation of the liner to allow for insertion of the liner within the shell part. The liner may have volume greater than, equal to or smaller than the volume of the container volume. After the liner is integrated to the shell parts and the shell parts are also integrated together, the liner may be expanded to maximize the internal volume and to press the engaged tabs to lay against the interior of the shell, against the shell wall, keeping them in a locked configuration. In a preferred embodiment the tabs that were deflected for alignment and assembly may spring back towards the inner wall of the shell and maintain their engaged to the adjacent or opposing tabs to maintain the locked configuration. Under typical impact and forces, the locked configuration with engaged features of opposing tab slots may be capable to maintain their assembled state.

In some embodiments, the provided system and method can be configured to connect one or more functional components such as a fitment to the container. The fitment can be formed with a plurality of flanges or registration features extending radially or circumferentially outwardly from the outer cylindrical or oval surface, spaced apart and located in such a way as to provide an interlock with features formed near the top of the structural shell part. The structural shell part can also comprise one or more flanges or registration features to mate with flanges or registration features of the fitment. The secure interlock between the fitment and the structural shell part can prevent any relative movement along a long axis of the fitment, or about the long axis of the fitment. In some cases, rotational movement may be allowed between the shell part and fitment about the long axis. The flanges or registration features may be secured to the fitment or the shell part by a glue, and adhesive, or by any other methods or compositions described herein. In some embodiments, the fitment can include a melt part that may comprise a thin film or other meltable part. The shell part can be secured to the fitment by melting or welding the melt part, which can resolidify and form an adhesive or physical connection between the shell part and the fitment. The flanges or registration features of the fitment may be engaged to the flanges or registration features of the shell part using the system and method as provided herein. Apparatus comprising suitable retention structures and cavity dimensions may be used to guide and assist the engagement process. In some cases, the flanges or registration features of the fitment may be secured to the flanges or registration features of the shell part by other methods such as adhesive or glue. The flanges or registration features of the fitment can be complementary to the flanges or registration features of the shell part.

In some embodiments, the container shell comprises a fiber or pulp-molded body. The fiber and pulp-molded body can be a clam shell, a two-piece shell, a multi-piece shell, or a combination thereof. The clam shell can be a fiber or pulp-molded body with a hinge that can be located on any side of the clam shell and a plurality of internal interconnecting features included on the opening side for a closure of the body. The two-piece shell can comprise two fiber or pulp-molded body pieces that have internal interconnecting features for securing the pieces to each other. The two-piece shell can be a two-part assembly of two halves of the body. However, the two pieces need not be equivalent in size. For instance, one piece can be of greater portion of the body structure than the other piece. The two-piece shell can be joined with each other along any direction on any surface. For example, the two-piece shell can be a top half and a bottom half that are joining each other not along a side parallel to the longitude axis of the container. Once the two pieces are joined, the inter-connecting tabs may be disposed in an internal region to the container resulting in a smooth connecting seam on the outer surface. A multi-piece shell can comprise two-piece fiber or pulp-molded body piece combined with a cap or bottom for securing the multi-piece shell in a closed form, or three-piece fiber or pulp-molded body piece or more. Pieces of the container shell can be assembled together using the provided method and system via the inter-connecting features only, or a combination of the inter-connecting features and any other means known to those skilled in the arts.

The containers may be suitable for containing various types of materials. For example, the containers may be suited for holding liquids, granules, solids, or semi-solids. The containers may hold beverages, food, powders, pellets, pills, detergent, or other materials.

The material used for forming the container shell need not be food-grade. In some embodiments, additional features such as a liquid-holding vessel can be included for holding liquid, or any feature that is made of food-grade material can be included inside the container shell. Accordingly, the outer shell can be separated to be recycled and the other features made of different materials can be disposed or recycled as applicable. The container shell can comprise biodegradable materials, such as molded fiber or pulp or paper. For example, the container shell may comprise 100% post-consumer fiber or pulp feedstock. In another example, the shell may comprise 100% recycled corrugated fiberboard and newspaper. The container shell or other materials described herein can include virgin fiber or pulp stock. The container shell can comprise type-2 molded fiber, type-2A thermoformed fiber, type-3 thermoformed fiber, type-4 thermoformed fiber, molded fiber, X-RAY formed fiber, infrared formed fiber, microwave formed fiber, vacuum formed fiber, structural fiber, sheet stock, mandrel stock, recycled plastic, thermoformed plastic, sheet plastic, or any other structural material. Any of the materials that may be used to form the container shell may be used in any of the embodiments described herein. Any discussion of pulp may also apply to any of the materials (e.g., fiber molding, natural fibers, biodegradable or compostable materials, or formed sheet material or films) that may be used to form a container shell. Formulations can be adjusted to improve desired performance aspects including, but not limited to, strength when wet, tensile strength, compression strength, moisture resistance, oxygen or $CO_2$ or other gaseous permeability.

The container shell may be formed from two, three or more types of pulp molded parts. The container shell made of multiple parts may comprise parts formed from any suitable materials described elsewhere herein. The shell parts may or may not be made of the same material. Materials may be combined for the purpose of cost reduction, increasing structural performance, increasing impact attenuation, and for providing areas of higher tolerance as well as areas of lower tolerance in the same container such that, for example, the high tolerance areas may be specifically located for the interlocking features. In some cases, the shell may have been assembled for desired structural performance and for allowing for disassembly to facilitate recycling or composting of the unassembled materials.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for forming or assembling a container, the method comprising:

providing a first set of inter-connecting features at a first portion of the container and a second set of inter-connecting features formed at a second portion of the container;

providing at least one retention structure associated with at least one of the first set of inter-connecting features and the second set of inter-connecting features;

engaging the first set of inter-connecting features and the second set of inter-connecting features using the at least one retention structure;

locking the first set of inter-connecting features in engagement with the second set of inter-connecting features to form the container, wherein locking the first set of inter-connecting features with the second set of inter-connecting features includes flexing the first set of inter-connecting features against the second set of inter-connecting features; and retracting the at least one retention structure while retaining the locked engagement between the first set of inter-connecting features and the second set of inter-connecting features.

2. The method of claim 1, further comprising guiding the first set of inter-connecting features into engagement with the second set of inter-connecting features via the at least one retention structure.

3. The method of claim 2, wherein the at least one retention structure is mounted to the first portion of the container.

4. The method of claim 2, wherein the at least one retention structure is mounted to the second portion of the container.

5. The method of claim 2, wherein the first portion of the container is a first shell part and the second portion of the container is a second shell part and guiding the first set of inter-connecting features further comprises positioning at least one of the first shell part and the second shell part such that the first set of inter-connecting features and the second set of inter-connecting features are aligned and engaged at a predetermined angle.

6. The method of claim 5, wherein the predetermined angle is between 1 degree and 50 degrees.

7. The method of claim 2, wherein the first set of inter-connecting features further comprises a plurality of tab features and the second set of inter-connecting features further comprises a plurality of slit features, and guiding the first set of inter-connecting features further comprises deflecting the plurality of tab features as the plurality of tab features approach the plurality of slit features.

8. The method of claim 1, wherein locking the first set of inter-connecting features with the second set of inter-connecting features further comprises flexing the first set of inter-connecting features against the second set of inter-connecting features.

9. The method of claim 1, further comprising timing the retracting the at least one retention structure to release the container.

10. The method of claim 1, wherein the providing at least one retention structure further comprises providing a first set of retention structures associated with the at least one of first set of inter-connecting features and the second set of inter-connecting features and providing a second set of retention structures associated with the at least one of first set of inter-connecting features and the second set of inter-connecting features.

11. The method of claim 10, wherein each retention structure of the first set of retention structures further comprises a lead-in feature and a retention feature which are configured to guide the at least one of first set of inter-connecting features and the second set of inter-connecting features.

12. The method of claim 10, wherein each retention structure of the second set of retention structures comprises a deflection feature which is configured to deflect the at least one of first set of inter-connecting features and the second set of inter-connecting features to a pre-determined deflection level so as to reduce friction or collision during the engagement the first set of inter-connecting features and the second set of inter-connecting features.

13. The method of claim 1, wherein the at least one retention structure is provided in a shell loading mode, the method further comprising transforming the at least one retention structure from the shell loading mode to an integration mode.

14. The method of claim 13, wherein transforming the at least one retention structure from the shell loading mode to the integration mode further comprises rotating the at least one retention structure about an axis.

15. A method for forming or assembling a container, the method comprising:

providing a first set of inter-connecting features at a first portion of the container and a second set of inter-connecting features formed at a second portion of the container;

providing at least one retention structure associated with at least one of the first set of inter-connecting features and the second set of inter-connecting features, the at least one retention structure being in a shell loading mode;

guiding the first set of inter-connecting features into engagement with the second set of inter-connecting features via the at least one retention structure; and transforming the at least one retention structure from the shell loading mode to an integration mode.

16. A method for forming or assembling a container, the method comprising:

providing a first set of inter-connecting features at a first portion of the container and a second set of inter-connecting features formed at a second portion of the container;

providing at least one retention structure associated with at least one of the first set of inter-connecting features and the second set of inter-connecting features;

engaging the first set of inter-connecting features and the second set of inter-connecting features using the at least one retention structure;

locking the first set of inter-connecting features in engagement with the second set of inter-connecting features to form the container;

retracting the at least one retention structure while retaining the locked engagement between the first set of inter-connecting features and the second set of inter-connecting features; and timing the retracting the at least one retention structure to release the container.

17. A method for forming or assembling a container, the method comprising:

providing a first set of inter-connecting features at a first portion of the container and a second set of inter-connecting features formed at a second portion of the container;

providing at least one retention structure associated with at least one of the first set of inter-connecting features and the second set of inter-connecting features, the at least one retention structure is provided in a shell loading mode;

engaging the first set of inter-connecting features and the second set of inter-connecting features using the at least one retention structure;

locking the first set of inter-connecting features in engagement with the second set of inter-connecting features to form the container;

retracting the at least one retention structure while retaining the locked engagement between the first set of inter-connecting features and the second set of inter-connecting features; and transforming the at least one retention structure from the shell loading mode to an integration mode.

* * * * *